United States Patent [19]

Sem-Sandberg

[11] Patent Number: 4,514,841
[45] Date of Patent: Apr. 30, 1985

[54] CONNECTING UNIT FOR A RING BUS

[75] Inventor: Sverre G. Sem-Sandberg, Handen, Sweden

[73] Assignee: Telefonaktiebolaget LM Ericsson, Stockholm, Sweden

[21] Appl. No.: 474,632

[22] PCT Filed: Jun. 28, 1982

[86] PCT No.: PCT/SE82/00229
§ 371 Date: Mar. 2, 1983
§ 102(e) Date: Mar. 2, 1983

[87] PCT Pub. No.: WO83/00238
PCT Pub. Date: Jan. 20, 1983

[30] Foreign Application Priority Data

Jul. 10, 1981 [SE] Sweden ............................... 8104322

[51] Int. Cl.$^3$ .............................................. H04J 3/08
[52] U.S. Cl. ....................................... 370/55; 370/86
[58] Field of Search ................... 370/55, 85, 86, 75, 370/97; 375/4; 340/825.05, 825.06, 825.16; 455/7, 9; 179/170 R, 170 J, 170 T

[56] References Cited

U.S. PATENT DOCUMENTS 3,825,896  7/1974  Obenhaus ........................... 455/602
4,121,054 10/1978  Popkin ................................ 370/55
4,402,075  8/1983  Bargeton et al. ................... 370/97

Primary Examiner—Benedict V. Safourek
Attorney, Agent, or Firm—Roberts, Spiecens and Cohen

[57] ABSTRACT

The invention relates to a method and arrangement in a telecommunications system for obtaining, in transmitting information between terminals commonly connected by a ring bus, an adaption at the interface between the bus and respective terminal, where the terminals may assume different logical conditions. The intention with the arrangement in accordance with the invention is that a breakdown in any of the connected terminals may never cause a breakdown of the ring bus. Such breakdowns may, for example, depend on lack of power or that the terminal assumes a "passive" condition, i.e. does not desire to send.

The arrangement includes a connecting unit (CU) at each interface of a terminal and the bus. The unit comprises: A regenerative differential amplifier (F1) containing an amplifier, a clock pulse unit (CL) and a regenerator; switching logic (G1, G2) and an output circuit. Transceive logic (A) in the terminal coacts with the connecting unit such that it supplies control signals to the switching logic of the connecting unit.

The connecting unit functions as a switch between terminal and bus, such that when the terminal assumes the PASSIVE condition, or is without power, the signals from the bus (RB) pass through the connecting unit and bypass the terminal. When the terminal desires to transmit and assumes the ACTIVE condition, it sends inhibiting signals (I) to the switching logic (G1, G2) in the connecting unit, whereon the signal path is broken through the latter, the signals flowing through the terminal instead.

2 Claims, 2 Drawing Figures

CONNECTING UNIT FOR A RING BUS

TECHNICAL FIELD

The invention relates to a method and arrangement in a telecommunications system for obtaining, in transmitting information between terminals commonly connected by a ring bus, an adaption at the interface between the bus and respective terminal, where the terminals may assume different logical conditions.

BACKGROUND ART

In the known art, units with a simple repeater function are customarily used, i.e., the signals pass straight through the unit, only obtaining a correction of the signal shape in relation to the distortion in the line. As an example of such a connecting unit, reference is made to a circuit made by EXAR INTEGRATED SYSTEMS INC, type XR-C277. The circuit has a regenerating repeater function utilized in PCM systems.

DISCLOSURE OF INVENTION

A problem with arrangements in the known art is that a fault, e.g., in the form of an interruption in any of the terminals connected to the ring bus, also causes a breakdown of the entire bus, and in the case of a series bus this stops all traffic on the bus. The inventive arrangement, characterized by the claims, solves this problem by each of the terminals being connected to the bus via a connecting unit. The terminals can assume different conditions in relation to the bus. With the power supply unavailable the terminal is not connected, and can neither receive nor monitor the data flow on the bus. With power being supplied, but in the OFF LOOP condition the terminal is not connected to the bus, but it can monitor the data flow. In the PASSIVE condition the terminal is connected to the bus for receiving the data flow, and the terminal can also interrupt the data flow if it is commanded to go active. In the ACTIVE condition the terminal has access to the bus and also the initiative in the traffic occurring.

The connecting unit functions as a switch between the ring bus and terminal such that when the terminal is not supplied with power, the data flow on the bus goes straight through the unit, the latter then functioning purely as a repeater, whereas when power is supplied to the terminal and it is in the ACTIVE condition, for example, switching takes place in the unit preventing the data flow on the bus from passing through the unit, the flow passing instead through the terminal through the output transformer of the unit and out on to the bus.

In the terminal there is transceive logic coacting with the connecting unit, for receiving information from the unit for analysis. The signal on the bus also continues straight through the unit, which has a repeater function. The terminal awaits connection to the bus until it has received a particular code combination in the incoming data flow. When this combination is received the terminal sends an inhibition signal to the connecting unit, thereby interrupting the data flow through it. In conformity with received information the terminal subsequently sends data out to the bus via the output transformer of the unit. Information on the bus now flows through the terminal and may be affected by the latter. The inhibition signal is also triggered by absence of power.

The aim of the arrangement in accordance with the invention is thus to obtain a security function against faults, this function maintaining the data flow through the ring bus, even if a break should occur in any of the terminals connected to the bus.

BRIEF DESCRIPTION OF DRAWINGS

The inventive arrangement will now be described in detail with the aid of an embodiment, while referring to the appended drawings, on which.

MODE FOR CARRYING OUT THE INVENTION

Figure 1:
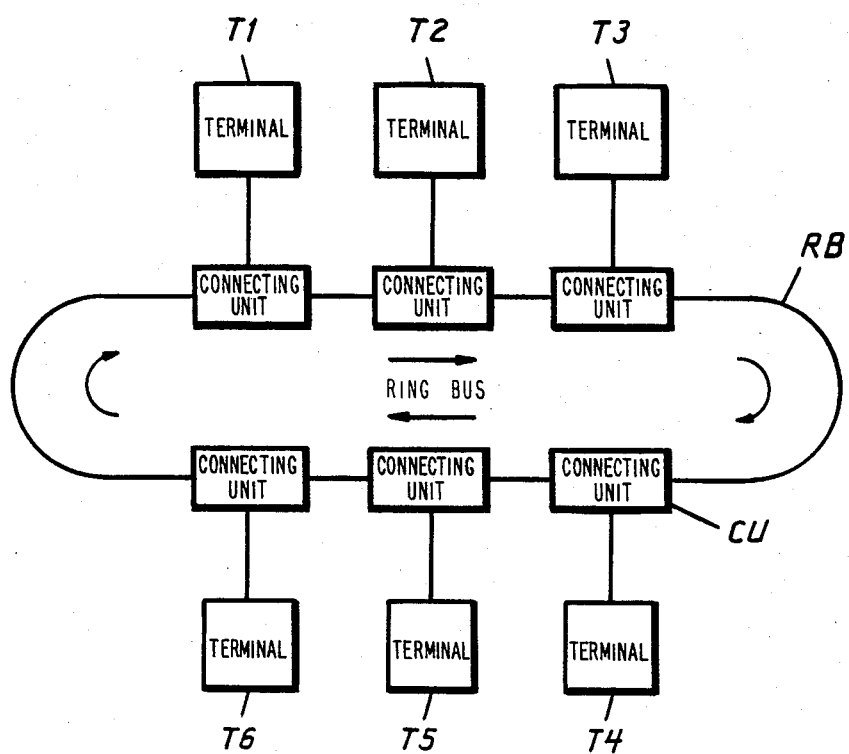
FIG. 1 is a block diagram of a system in which the arrangement is included.

As will be seen from FIG. 1, a plurality of terminals T1-T6 are each connected to a common ring bus RB via a connecting unit CU. The bus is of the single direction series type, which means that data only flow through the connecting unit in one direction.

Figure 2:
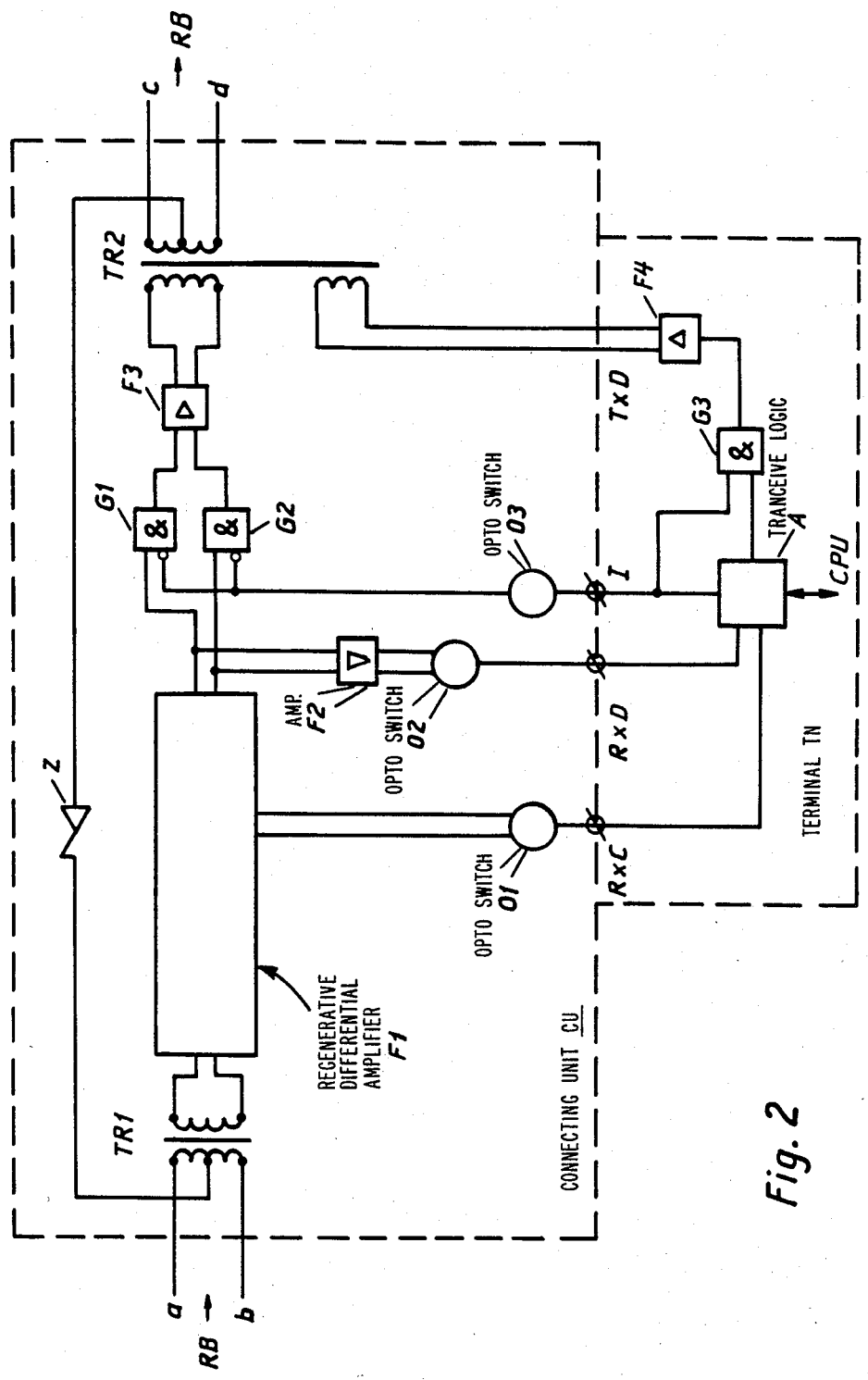
FIG. 2 is a logic diagram of a connecting unit in accordance with the invention and indicates the transceive logic in the terminal for the sake of clarity.

According to FIG. 2, the information circulating on the bus is received by the unit on the input a/b of a transformer TR1. An output transformer TR2 sends information to the bus RB via an output c/d. Constant power supply to the unit is obtained conventionally with the aid of a zener diode Z, connected between the centre taps of the primary winding of the input transformer TR1 and the secondary winding of output transformer TR2.

Circuit logic is connected between the transformers, and is utilized as repeater or switching logic according as requirements. It includes the following: A regenerative differential amplifier FI, e g made by EXAR INTEGRATED SYSTEMS INC, type XRC 277, containing a clock signal unit and a regenerative repeater for regenerating incoming data, as well as for generating synchronizing signals of the terminal transceive logic A; an amplifier F2 for distributing to the input of the terminal receiver data signals coming from the bus and regenerated in the amplifier F1; switching logic comprising two gate circuits G1, G2 for breaking the information path between the connecting unit input and output transformers on receiving an inhibition signal from the terminal transceiver logic when the terminal is in the send mode; an output amplifier F3 connected to the output transformer.

Three optoswitches 01, 02, 03, e g made by HEWLETT PACKARD, type 6N 137, are coupled between the connecting unit and the terminal transceive logic as galvanic insulation.

Typical terminal T includes conventional hardware including gate G3, amplifier F4 and transceiver logic A. Logic A includes an ADLC circuit such as MOTOROLA M6854 and a conventional loop logic (both not shown) controlled by a microprocessor CPU such as MOTOROLA 68000.

A switching sequence with the aid of the arrangement is implemented in the following way.

Information from the ring bus RB is applied to the input a/b on the transformer TR1 in the connecting unit CU. When the terminal TN connected to the unit CU is not energized, the information flow passes through the amplifier F1, in which it is regenerated. The regenerated data flow passes through the output amplifier F3 and output transformer TR2 and once again out onto the bus RB. In this case the connecting unit has solely functioned as a repeater.

In the case where the terminal is energized, but is still not connected to the bus, the connecting unit again acts as a repeater, but the information is simultaneously received on the terminal reception input R×D via the amplifier F2 and the optoswitch 02. The terminal T then analyses the information while awaiting the appearance of a message in the form of a given code combination. Clock pulses to the input R×C of the terminal section T are sent simultaneously from the connecting unit clock CL via the optoswitch 01.

In the transceiver logic A now in the receiver mode of the terminal TN, a comparison is made between received code combinations and fixed combinations, and for conformity, i.e., when the terminal itself desires to transmit, an inhibition signal I is sent to one input on each of the gate circuits G1, G2, in the connecting unit. The inputs are inverting, and when activated, e.g., by logical 1's, communication between the amplifier F1 and output amplifier F3 is broken. The terminal T1 now sends information via a gate G3 and an amplifier F4 to the transmitter output T×D via the connecting unit transformer TR2 out onto the ring bus RB. In this case the information is guided through the terminal, and the bridging function of the connecting unit is broken off. From what has been described, it will also be seen that for a breakdown in the terminal, the inhibiting signal is not forthcoming, and the unit once again functions as a repeater, i.e., no breakdown in any terminal T1–T6 can give rise to a breakdown on the bus. The electronic switching described may naturally be implemented optically using optical fibre switches, the electronic switching logic then being repeated by optical switches, e.g., made by NIPPON ELECTRIC, type OP-8751.

I claim:

1. A telecommunication system comprising a plurality of terminals for accepting or transmitting information;
   a plurality of connecting units;
   bus means interconnecting the connecting units to form a ring bus so that information flows in a loop;
   a plurality of terminals capable of receiving and transmitting information; each of said terminals including emitting means for emitting activity signals to indicate when the terminal is energized and desires access to the information flow of the loop;
   means for connecting each terminal to an associated connecting unit whereby information can flow from the connecting unit to the terminal and from the terminal to the connecting unit, said connecting means also connecting the emitting means to the connecting unit to feed the activity signals when present to the connecting means; and
   said connecting means having an input means for receiving information from said bus means, output means for transmitting information to said bus means, controlled gating means connecting said input means to said outputs for permitting the transfer of information directly from said input means to said output means in the absence of the activity signals and
   further gating means reponsive to the activity signals for connecting said input means to the associated terminal and said associated terminal to said output means when the activity signals are present whereby information flows from said input means via said associated terminal to said output means instead of directly from said input means to said output means.

2. The system of claim 1 whereby said connecting means comprise opto switches.

* * * * *